H. Wanklin.
Salinometer-Pot.
№ 74958. Patented Feb. 25, 1868.
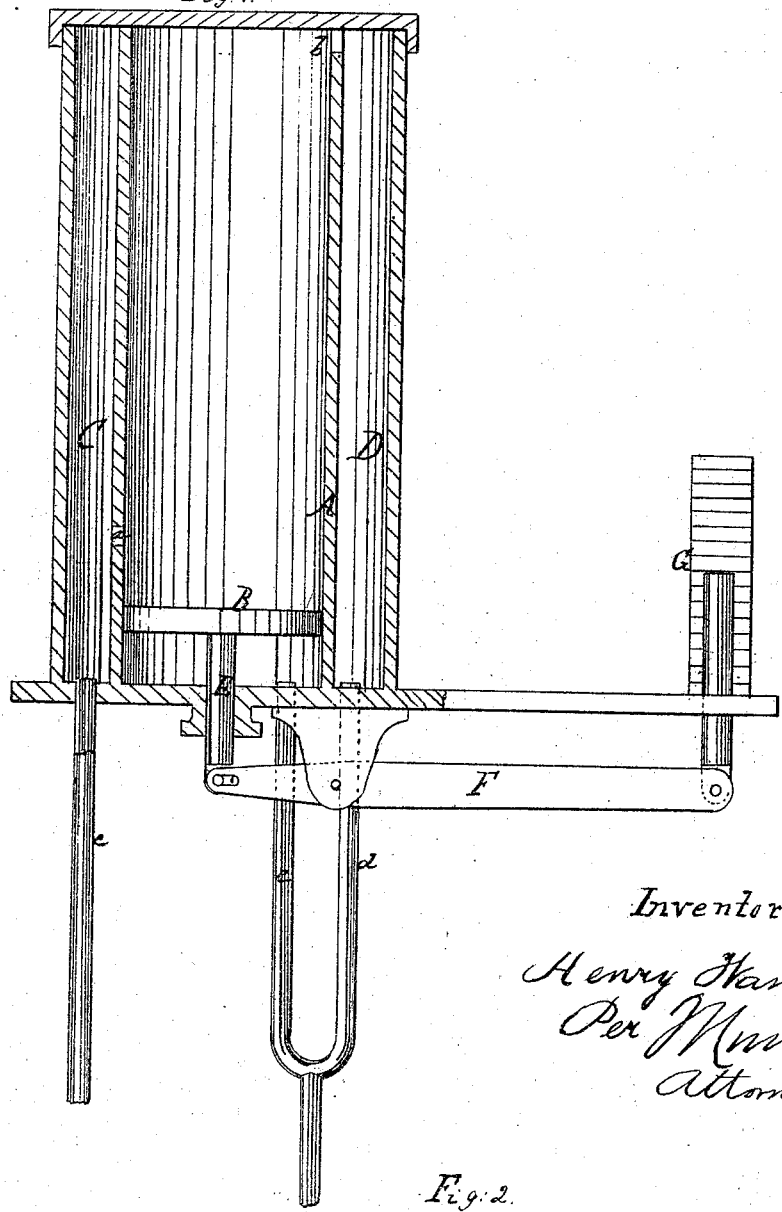
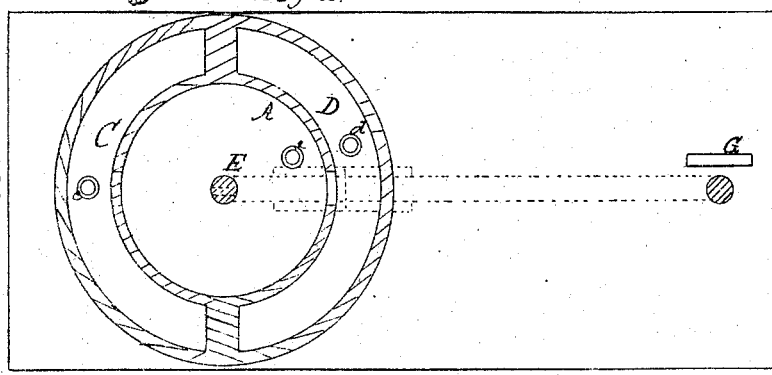
Witnesses
Theo Fusche
Alex F. Roberts
Inventor
Henry Wanklin
Per Munn & Co
Attorneys

United States Patent Office.

HENRY WANKLIN, OF UNITED STATES REVENUE STEAMER "WILDERNESS."

Letters Patent No. 74,958, dated February 25, 1868.

IMPROVEMENT IN SALINOMETER-POTS.

*The Schedule referred to in these Letters Patent and making part of the same.*

TO ALL WHOM IT MAY CONCERN:

Be it known that I, HENRY WANKLIN, of the United States revenue steamer "Wilderness," have invented a new and improved Salinometer; and I do hereby declare that the following is a full, clear, and exact description thereof, which will enable others skilled in the art to make and use the same, reference being had to the accompanying drawings, forming part of this specification, in which—

Figure 1 represents a vertical central section of this invention.

Figure 2 is a horizontal section of the same.

Similar letters of reference indicate like parts.

This invention relates to a salinometer in which the gravity of the water is determined by an ordinary scale-beam and weights, instead of by a hydrometer, as usual. In the salinometer-pot is fitted a piston, which works easily up and down, and from the bottom of which extends a rod, which is hinged to one end of a scale-beam, the other end of which is so arranged that it can be loaded with suitable weights. If the pot is filled with water from the boiler, the weight of the column of water resting on the piston can be determined, and by these means the percentage of salt contained in the water is observed.

A represents an ordinary salinometer-pot, which is bored out so as to receive the piston B, which fits freely and works up and down quite easily. On the sides of the cylinder are formed two chambers, C D, which communicate with the interior of the cylinder through apertures $a$ $b$. The chamber C forms the receiving-chamber, and it connects by a pipe, $c$, with the water-space of the boiler. The water from the latter passes through the pipe $e$ to the chamber C, from which it flows to the salinometer-pot through the opening $a$. An ordinary cock may be placed in the pipe $e$, at any suitable point, to open or close the communication between the salinometer and the boiler, so that the volume or quantity of water in the former may be collected and weighed independently of the water in the boiler. The chamber D is the overflow or waste-chamber, the waste-water being carried overboard, or to the bilge, by means of the pipe $d$. A pipe, $e$, extends from the bottom of the cylinder A to the waste-pipe $d$, and through this pipe the water leaking past the piston is carried off. From the under side of the piston B extends a rod, E, through the cylinder-head, and this rod connects with the short-arm of a scale-beam, F, the long arm of which is so loaded with a weight or weights, and so arranged that it sweeps over a scale, G, whereby the weight of the water pressing on the piston B, as indicated, may be determined. By the proportion existing between the long and short arm of the scale-beam, a comparatively small motion of the piston produces a perceptible motion of the pointer attached to the long arm, and a slight change in the weight of the water can be readily observed.

The scale G is indicated by actual experiment, using saline solutions of gradually increasing strength, and as the specific gravity of the water increases with the percentage of salt dissolved in it, the quantity of salt contained in the water of the boiler can be readily determined, without the use of a hydrometer or a thermometer.

It must be remarked that, instead of the movable piston, a flexible or elastic diaphragm might be used, which could be connected to a scale-beam or to a pointer, by means similar to those used in steam-gauges, and a suitable blow-off cock would carry off the water after its specific gravity is determined.

What I claim as new, and desire to secure by Letters Patent, is—

A salinometer, in which the specific gravity of the water is determined or measured by its pressure on a movable piston, substantially as and for the purpose set forth.

The above specification of my invention signed by me, this 23d day of February, 1866.

HENRY WANKLIN.

Witnesses:
G. W. WANKLIN,
JOHN ELLIOTT.